Aug. 31, 1965   F. WHITTLE ETAL   3,203,184
FLUID PRESSURE MOTIVE SYSTEMS, FOR BOREHOLE DRILLING
Filed Oct. 13, 1964   3 Sheets-Sheet 3
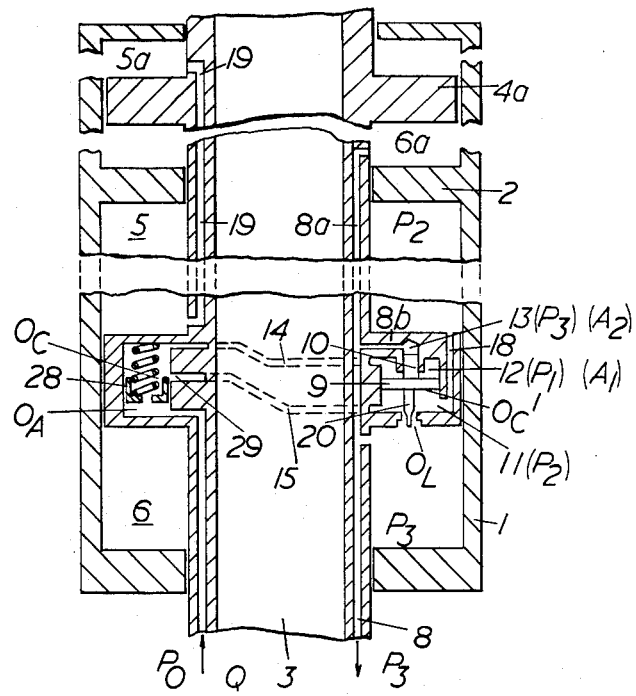
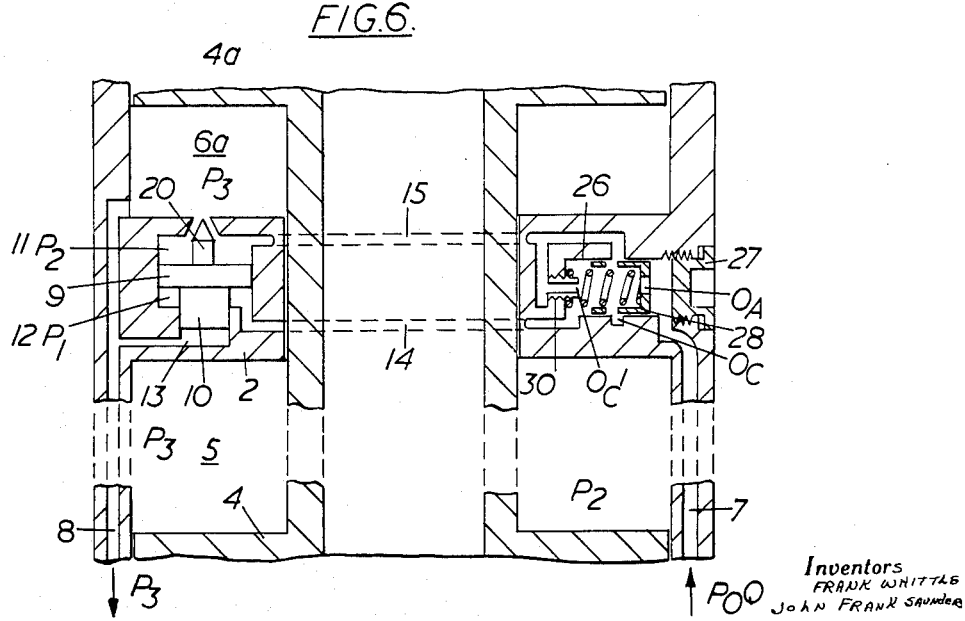
Inventors
FRANK WHITTLE
JOHN FRANK SAUNDER
By
Attorneys United States Patent Office 3,203,184
Patented Aug. 31, 1965

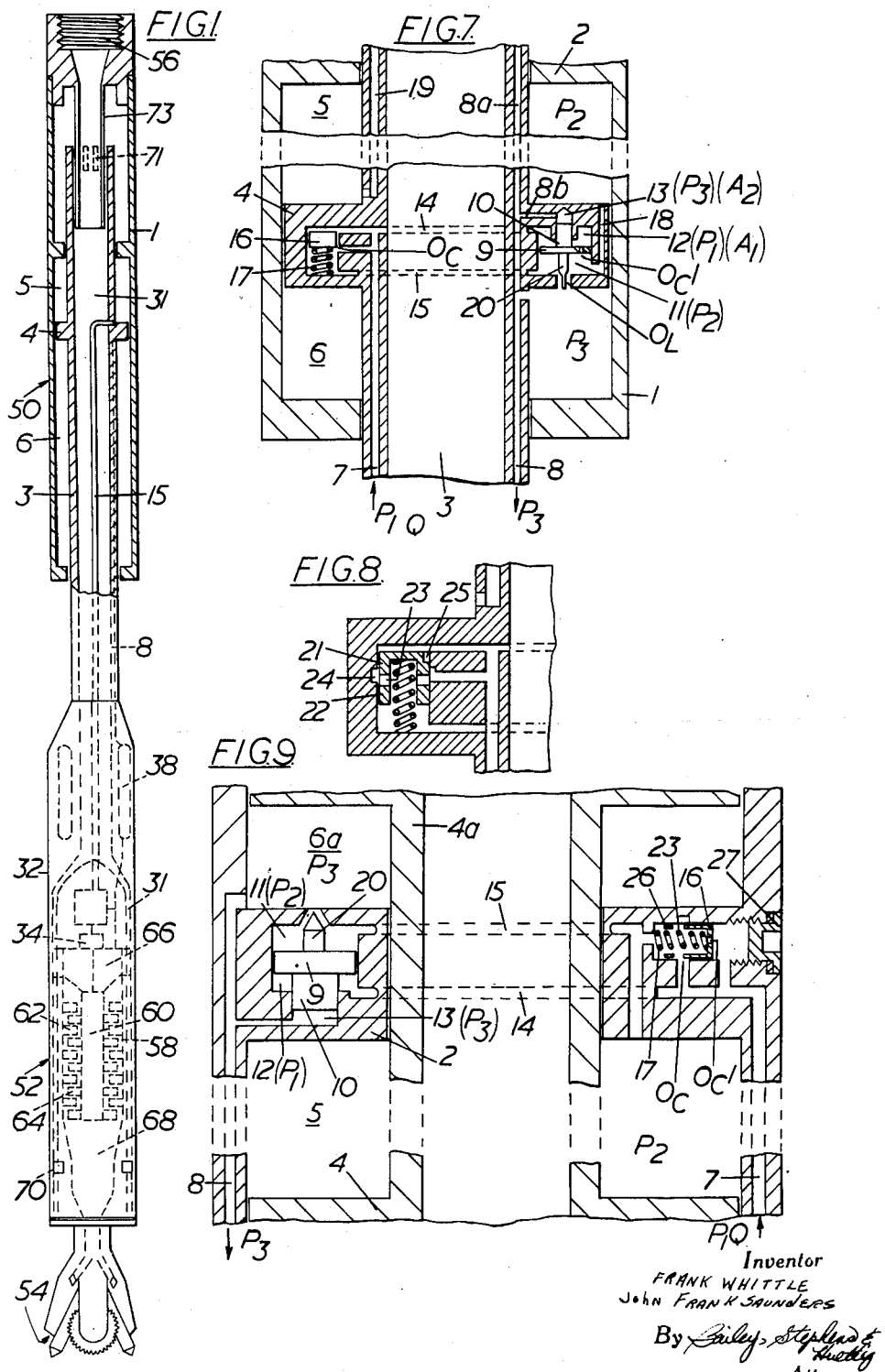

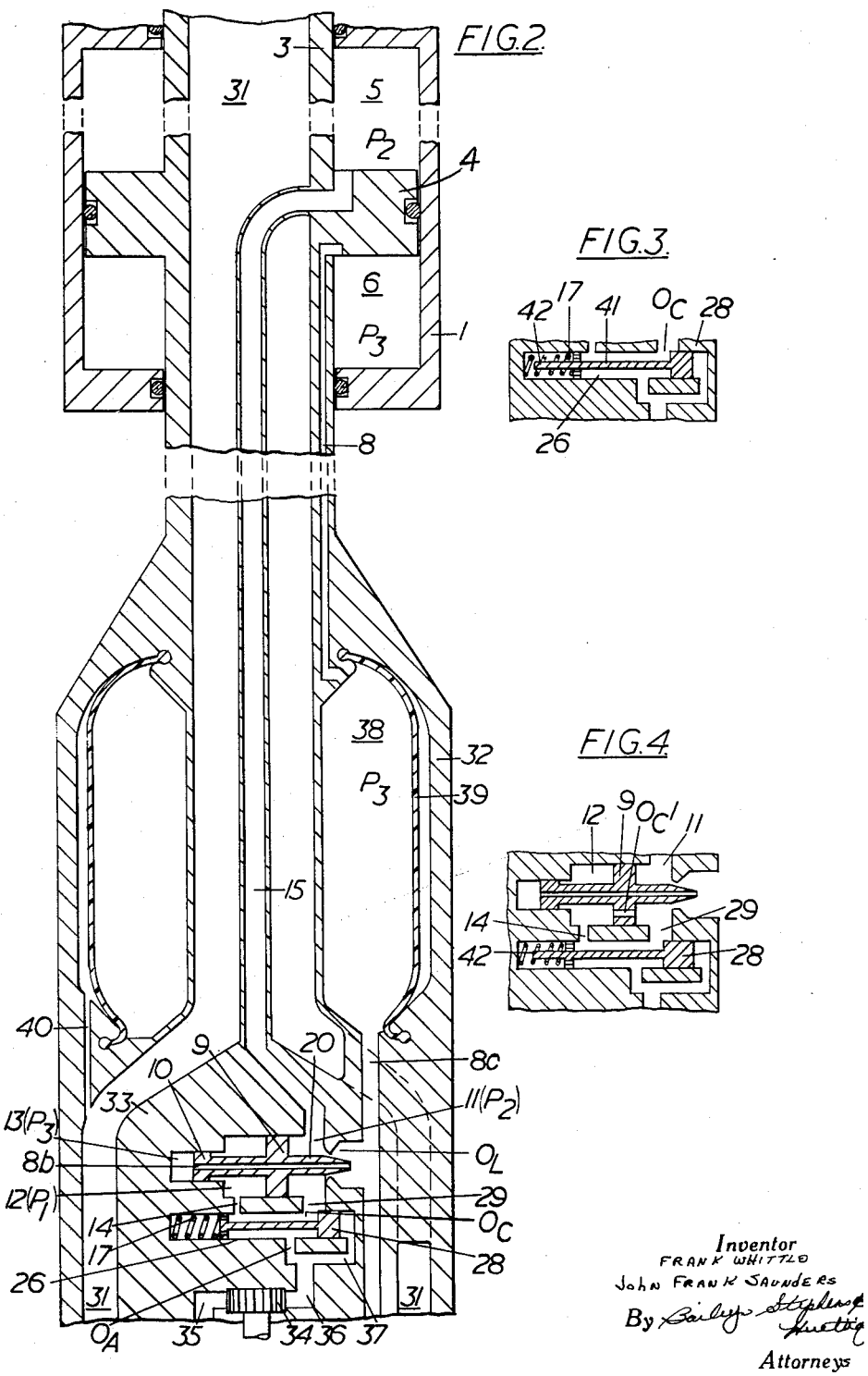

3,203,184
FLUID PRESSURE MOTIVE SYSTEMS, FOR BOREHOLE DRILLING
Frank Whittle, Walland Hill, Chagford, England, and John Frank Saunders, Northfield, Bristol, England; said Saunders assignor to said Whittle
Filed Oct. 13, 1964, Ser. No. 403,597
Claims priority, application Great Britain, Oct. 15, 1963, 40,667/63
11 Claims. (Cl. 60—52)

Pending United States patent application No. 240,852 filed November 29, 1962 relates to fluid pressure motive systems comprising a flow path for a working fluid, two orifices in series in the flow path, a motive piston and cylinder or its equivalent connected to the flow path so that the piston will be subjected to the pressure drop across one only of the orifices, and means for varying the area of the last-mentioned orifice to maintain the pressure drops across the two orifices directly proportional to one another.

In these systems, only the flow through the last-mentioned orifice, conveniently termed the "loading orifice," is subject to variations with the speed of the motive piston relative to its cylinder. The flow through the other orifice, conveniently termed the "control orifice," is always equal to the rate of flow of the working fluid, and the pressure drop across the control orifice is therefore (unless a further factor is deliberately introduced) a function only of that rate. Since the pressure drop across the loading orifice is held proportional to that across the control orifice, the output force can be independent of the speed of movement of the piston relative to its cylinder.

Such systems can be used with advantage in feed devices for rotary drills in which it is desired to maintain a selected relationship between the rotational speed of the drill and the feed force applied to it, independently of the rate of advance of the drill. In particular, such a system may be applied to borehole drilling equipment for oil wells and the like, for connection to the lower end of a drill string, the equipment being of the kind comprising a hydraulic ram and a "down-hole" motor having an output shaft for connection to a rotary drill bit. The motor can be arranged to drive a positive displacement pump which delivers working fluid to the ram, and thus produces an extension force for loading the bit which is a function of the motor speed.

The said application describes, amongst others, an embodiment having means for increasing the area of the control orifice with increase of flow through it so that, by suitable selection of the profile of the opening, the pressure differential across the control orifice may be caused to increase according to a desired law at a rate less than proportional to the square of the flow.

The said application also states that by a converse arrangement, such that the area of the opening decreases with increase of flow through the opening, the pressure differential across the control orifice could be caused to increase at a rate greater than proportional to the square of the flow.

The last-mentioned arrangement has been found particularly useful for borehole drilling equipment of the kind previously described in cases in which a substantial part of the total load on the bit, known as the "bit weight," is accounted for by factors which vary little or not at all with motor speed, since it permits large changes in ram force to be obtained for relatively small changes in motor speed, so that effective motor speed regulation can be obtained notwithstanding the large substantially invariable component of the bit weight. This invariable component may consist of an extension force in the ram caused by pressure of the drilling fluid conveyed through it to the drill bit (such fluid possibly also driving the motor) and of the deadweight of the ram output member and the parts attached to it, including the motor and the drill bit.

The significance of this is that the drill bit operates most effectively, and with least wear, within a definite range of speed rotation, and this speed range is substanially the same for strata of a wide range of hardness, but the resistance to rotation experienced by the motor varies widely with the nature of the strata. Considerable practical difficulties are encountered in attempting to exert the necessary control from the ground surface by varying the pressure or rate of flow of actuating fluid being supplied to the drill string or by varying the weight of the bit. Some automatic means housed within the drilling equipment is therefore preferred, for regulating the motor speed, and an arrangement as described in the last paragraph can act in this way. It does so by producing sufficient variations in the ram force to ensure that the total force on the bit will rise and fall markedly in response to any tendency of the bit speed to rise and fall with changes in strata or state of wear of the bit. Thus any decrease in resistance to rotation due to a change in strata will be largely counteracted by an increase in resistance due to greater force on the bit, and vice versa, and hence the bit speed variations will be kept within the desirable range.

The arrangement suffers from the drawback however that dangerously high pressure can be developed in the hydraulic system under certain circumstances liable to occur in practice, and the object of the present invention is to provide a system retaining the advantage of operating with a control orifice the area of which decreases with flow up to a predetermined safe pressure level, while limiting the rate of increase of internal pressure thereafter.

Borehole drilling equipment according to the present invention comprises a hydraulic ram, a down-hole drilling motor, a positive displacement pump driven by the motor, a flow path for working fluid circulated by the pump, control and loading orifice systems in series in the flow path, the ram being connected to the flow path so that it will be subjected to the pressure drop across the loading orifice system only, means for varying the area of the loading orifice system to maintain the pressure drops across the two orifice systems directly proportional to one another, means for reducing the area of the control orifice system with increase of flow through it and vice versa, and means preventing reduction of the area of the control orifice system below a preselected minimum.

The means for varying the area of the control orifice system may be an actuator operated by the pressure drop across the control orifice system, but in cases where this pressure drop is inconveniently large and would thereby give rise to difficulties in the design and/or manufacture of the actuator, it is preferred, according to an important feature of the invention, that the latter should be arranged to operate in response to the pressure drop across an orifice, conveniently termed the "actuator orifice," arranged in series with the control orifice system.

These and other features of the invention are illustrated by the examples shown in the accompanying drawings. In the drawings:

FIGURE 1 is a diagrammatic side view, with parts in vertical section, showing the general layout of one drilling equipment;

FIGURE 2 is an enlargement of the central portion of FIGURE 1, showing the orifice systems and related parts, in vertical section;

FIGURES 3 and 4 show two variations from FIGURE 1;

FIGURE 5 shows another arrangement with the orifice systems in a piston of the ram;

FIGURE 6 shows an arrangement with the orifice systems in part of an outer member of the ram;

FIGURES 7 and 8 show two variations from FIGURE 5; and

FIGURE 9 thows a variation from FIGURE 6.

The equipment shown in FIGURE 1 includes a hydraulic ram 50, a down-hole hydraulic drilling motor 52, and a drill bit 54. The ram comprises an outer member 1, which has a socket 56 at its upper end for attachment to the lower end of a tubular drill string through which drilling fluid is pumped from a source at ground level and a tubular inner member 3 having a passage 31 through which the fluid passes. The drill string and the source of drilling fluid are not shown; they may be of usual construction and are no part of this invention. The inner member 3 of the ram is attached at its bottom end to a casing 32. The lower part of the casing 32 houses the motor, which is in the form of a turbine driven by the drilling fluid and having contra-rotating concentric rotors 58, 60 carrying blades 62, 64. The rotors are geared together by gearing in a gearbox at 66. The outer rotor 58 is attached at its bottom end to the drill bit 54, and a bore 68 conveys fluid from the motor to the bit to flush away the rock debris produced by the bit as it cuts. The action of the ram imposes a downward force on the inner member 3, and this force is transmitted to the casing 32 and thence to the drill bit, together with the weight of the inner member and of the casing 32 and its contents. A thrust bearing 70 normally carries part of the downward force and part is transmitted by hydraulic pressure inside the casing 32. Torque reaction from the drill bit is transmitted from the motor casing 32 to the inner ram member 3, and via splines 71 to a tube 73 fixed to the socket 56, and thence to the drill string, which is connected to a rotary table of normal construction at ground level, whereby the drill string may be rotated at a slow rate to maintain its freedom in the borehole. The ram exerts an upward reaction on the drill string. To keep the main length of the drill string in tension despite this reaction, a lowermost part of the drill string is composed of so-called "tensioning collars" i.e. lengths of pipe having much greater wall thickness than the remaining lengths and therefore of much greater weight and stiffness.

The upper part of the motor casing, as shown in more detail in FIGURE 2, houses, in an island member 33 surrounded by the drilling fluid passage 31, a gear type oil pump 34, which is driven by the motor via the gearbox 66, and which supplies oil to the ram to produce an extension force proportional to a higher power than two of the motor speed, so as to regulate the motor speed in accordance with the principle already described. The gearbox and other parts of the motor requiring lubrication are connected to the low pressure side of the system.

The pump 34 draws oil from the motor through an inlet passage 35 and discharges it at pressure $P_0$ and flow rate Q through a passage 36 having a branch 37 leading to one end of a cylinder bore 26 containing an actuator piston 28 defining with an outlet port 29 a variable-area control orifice $O_C$. Another branch from the passage 36 enters the bore 26 below the piston 28 and constitutes an actuator orifice $O_A$ which drops the pressure to $P_1$, the difference $P_0-P_1$ being effective upon the piston 28 in opposition to a spring 17 to control the area of $O_C$. The pressure $P_1$ is communicated through a port 14 to a step chamber 12 around a stepped piston 9, 10, while the port 29 opens into a large area chamber 11 so that the pressure $P_2$ downstream of $O_C$ is effective in this chamber.

A passage 15 carries the oil at pressure $P_2$ to a chamber 5 above a ram piston 4 which is secured to the inner ram member 3. A chamber 6 below the ram piston is connected through a passage 8 to an annular oil reservoir 38 in the upper part of the motor casing 32 surrounding the drilling fluid passage 31, the reservoir having a flexible outer wall 39 which is subjected to the drilling fluid pressure in the passage 31 through a passage 40, so that the internal pressure in the reservoir and in the ram chamber is stabilised at a value $P_3$ which is a little above that of the drilling fluid entering the drilling motor by the amount of the pressure drop in the passage 31 between the passage 40 and the entry to the motor. From the reservoir 38 the oil passes through a passage 8c back to the pump 34 and to the parts of the motor requiring lubrication.

The stepped piston 9, 10 carries a needle 20 controlling the area of a loading orifice $O_L$ connecting the chamber 11 and the passage 8c, while a passage 8b through the needle 20 and the stepped piston allows the pressure $P_3$ to be effective in the smaller area chamber 13, so that the device operates in a manner presently explained in more detail. The passage 8b could of course be arranged in the island member 33 and communicate with either of the passages 8c or 35, or even directly with the drilling fluid passage 31 if there were no associated disadvantages.

In addition to the downward force due to the pressure of oil in chamber 5, the inner ram member 3 is subject to a downward force due to the difference between the pressure at which the drilling fluid is supplied to the passage 31 of the ram and the pressure at which the drilling fluid flows upwards from the drill bit around the exterior of the casing 32 and the ram 50. This pressure difference is made up of pressure drop through the motor, which is large, plus the pressure drop in the passages through the drill bit, and it acts on the whole cross section of the inner ram member 3 where it emerges from the outer ram member. Thus the "bit weight" consists of the force due to the drilling fluid, plus the "ram force" proper, i.e. the force due to the difference in oil pressures in the chambers 5 and 6 acting on the piston 4, plus the weight of the inner ram member 3 and all the parts attached to it. In order to restrain the motor speed within the desired range it is necessary, as explained above, to obtain large changes in ram force for relatively small changes in motor speed. With a control orifice $O_C$ of fixed area the pressure difference across the piston 4 would increase at a rate approximately proportional to the square of the rate of flow of the working liquid (this rate of flow is directly proportional to the speed of the pump, and hence to the speed of the motor) but with an arrangement as just described a substantially higher rate of increase can be obtained.

The drill string is lowered, by "draw works" above ground of usual construction, at a steady rate selected to approximate the average rate of progress of the drill bit. In various strata the drill bit progresses at differing rates, so that at times the ram is extending and at times it is contracting, although the force exerted by it is always downward. It is desirable that, up to the limit imposed by the maximum rate of delivery of the pump 34, the ram force should be independent of the rate of extension or retraction of the ram.

The means for achieving this result are in part similar to those described in the above-mentioned application No. 240,852, but the description and explanation necessary for an understanding of the complete system will be repeated for convenience.

The arrangement shown in FIGURE 2 provides that the loading orifice $O_L$ is regulated so that the pressure difference $P_2-P_3$, which acts across the loading orifice $O_L$ and which determines the ram force, is directly proportional to the pressure difference $P_1-P_2$ which acts across the control orifice $O_C$, regardless of the rate of extension or contraction of the ram. In addition, the area of the control orifice is regulated so that the pressure drop $P_1-P_2$ across the control orifice increases with an increase in flow of oil through it at a rate greater than that proportional to the square of the flow.

The latter effect is produced by the action of the piston 28. As flow increases, the pressure drop $P_0-P_1$ across the actuator orifice $O_A$ increases, and the piston 28 is shifted to the left so as to restrict the control orifice $O_C$ and thus produce a change in $P_1-P_2$ greater than that which would occur across a fixed-area control orifice.

The former effect is brought about by the stepped piston 9, 10 actuating the needle 20 in the loading orifice $O_L$.

Using the notation that $A_1$ is the area of the piston step and $A_2$ is the area of the part 10 of the stepped piston, balance is attained when:

$$(P_1-P_2)A_1 = (P_2-P_3)A_2$$

whence $$P_2-P_3 = (P_1-P_2)\frac{A_1}{A_2}$$

i.e. the pressure drop $P_2-P_3$ effective across the ram piston is directly proportional to $P_1-P_2$, which is the pressure drop across the control orifice $O_C$, already shown to increase at a higher rate than the square of the flow Q, and is of course independent of the speed of the ram piston 4.

To prevent closure of the control orifice port 29 to a value which would cause the pump discharge pressure to rise inadmissibly and cause damage to the equipment, the actuator piston 28 is, in the construction shown in FIGURE 2, made shorter than the port 29. Before the orifice $O_C$ closes completely, an alternative orifice thus begins to open on the other side of the piston 28 and reduces the possible rate of further increase of pressure drop across the orifice to below the square law value.

FIGURE 3 shows a variation in which the tail part 41 of the actuator piston 28, which in FIGURE 2 serves as a steadying guide for the piston and as an abutment for the spring 17, has an extension 42 of such length as to engage the end of the bore 26 and stop further closing of the orifice $O_C$ when the minimum permissible area has been reached. The pressure drop thereafter varies proportionally to the square of the flow Q. Instead of the tail part 41 being extended, there may be a step reduction in the bore 26 to limit travel of the piston 28, or an abutment pin, preferably adjustable, may be provided projecting axially into the bore from its spring housing end. Such a pin may, for example, be adjustably mounted in a plug constituting an abutment for the spring 17, the plug being independently adjustable for varying the compression in the spring.

FIGURE 4 shows another variation in which the extension 42 is of such length that the piston 28 can close the port 29 completely but not travel beyond it, and a fixed area control orifice $O_C^1$ is provided in the piston 9 allowing flow from the chamber 12 to the chamber 11. In this case the port 14 requires enlargement since it now has to pass the flow from the pump, and the profile of the port 29, which now operates in parallel with the orifice $O_C^1$, will require modification if the system as a whole is to operate according to the same law as the arrangement of FIGURE 2 or that of FIGURE 3.

FIGURE 5 shows an arrangement in which the control pistons are housed in bores in the ram piston 4. Moreover the ram is of tandem form, with an additional upper piston 4a and chambers 5a, 6a above and below it. In this arrangement the orifice $O_A$ is in the actuator piston 28, and after passing through this orifice which reduces its pressure to $P_1$, the working liquid passes through the variable area control orifice $O_C$ defined between the skirt of the piston and a port 29 leading by way of the passage 15 to the larger area stepped piston chamber 11. A fixed area control orifice $O_C^1$ in the piston 9 again prevents the control orifice area being reduced below a predetermined minimum.

The chamber 11 is connected to the ram chamber 5 by a passage 18 through the piston 4, and this chamber 5 is connected to the chamber 5a above the upper ram piston 4a by a passage 19, so that both these chambers are maintained at pressure $P_2$. The chamber 11 also communicates with the ram chamber 6, in which the pressure is $P_3$, through an orifice $O_L$ (the "loading orifice") the area of which is controlled by a needle 20 attached to the stepped piston. The pressure $P_3$ is also conveyed to the small area chamber 13 and to the ram chamber 6a below the upper piston by extensions 8a and 8b of the return flow passage 8.

FIGURE 6 shows a similar system applied to an arrangement in which the control system is arranged in a partition member 2 dividing a hydraulic ram into lower and upper tandem cylinders containing motive pistons 4 and 4a respectively, so that the control orifice system is exchangeable without dismantling the ram. In this arrangement, working liquid is supplied at pressure $P_0$ through a passage 7 in the outer member of the ram and returns at pressure $P_3$ from the chamber 6a below the upper piston 4a and from the corresponding chamber below the lower piston 4 through a passage 8. The control orifice actuator piston 28 carries the actuator orifice $O_A$ and operates in a radial bore 26 the outer end of which is closed by a screw threaded plug 27 which is removable to allow the piston to be exchanged for another having an orifice $O_A$ of different size, or ports 23 defining the variable area control orifice $O_C$ of different profile so that the characteristics of the system may be adapted to suit work at hand. The spring 17 may also be exchanged for one having different characteristics. In addition, a fixed area control orifice $O_C^1$ is formed in a plug 30 screwed into the base of the bore 26.

The arrangement shown in FIGURE 7 resembles that shown in FIGURE 5, but the orifice $O_C$ is constituted by a port controlled by an actuator piston 16 subjected in the orifice closing direction to the supply pressure $P_1$ and in the opposite direction to a spring 17 and the pressure $P_2$. The total area of the orifices $O_C^1$ and $O_C$ therefore diminishes as the pressure drop $P_1-P_2$ across them increases at a rate greater than that proportional to the square of the flow Q, the actual law depending upon the profile of the port controlled by the piston 16, and on the rate of the spring 17. A port which is convergent in the closing direction of movement of the piston will give a higher rate of increase than a divergent port. The port can however be initially divergent and finally convergent, for example circular. In the case of a sudden increase in Q, due for example to a drill loaded by the ram suddenly reaching hard strata in which the drill cuts more rapidly, it would be possible for the piston 16 to close the orifice $O_C$ completely, and but for the provision of the fixed orifice $O_C^1$ this would stall the pump, possibly causing its driving shaft to be sheared and possibly bursting the pump and/or the supply passage 7 due to the high transient pressure which could be developed.

FIGURE 8 shows a modification of the arrangement shown in FIGURE 7 in which the plain actuator piston 16 is replaced by an actuator piston 21 having a skirt 22 provided with ports 23 cooperating with the lower edge of a supply groove 24 to define the variable area control orifice $O_C$. The crown of the piston is also provided with a recess 25 which begins to open to the groove 24 before the ports 23 are fully closed, so as to establish a minimum control orifice area after attainment of which the control orifice area increases, so that the law relating pressure drop to Q changes to the form in which the rate of increase of pressure drop is less than proportional to the square of Q, the law depending upon the profile of the recess 25. With this arrangement a fixed orifice $O_C^1$ is not required in the stepped piston 9.

FIGURE 9 shows an arrangement which resembles FIGURE 6, but in which the piston 16 carries a fixed area control orifice $O_C^1$.

The arrangements shown in FIGURES 7 to 9 are operated by the pressure drop across the control orifice, and where this is large, difficulties occur in the design and manufacture of the system to give sufficiently accurate control. To avoid this difficulty, it is preferable to arrange that the actuating piston is operated by the pressure drop across an actuator orifice $O_A$ through which the whole of the flow Q passes, as shown in FIGURES 2 to 6. This orifice causes the discharge pressure of the pump to be increased from the value $P_1$ shown in FIGURES 7 to 9 to the value $P_0$ shown in FIGURES 2 to 6.

In all the examples, the loading orifice system, and the actuator orifice when used, is downstream of the control orifice system, the pressure applied to the larger end of the stepped piston is from between the two orifice systems, and the pressure from upstream of both systems can be applied to the step, as in the examples, or to the smaller end, the choice being determined by convenience, and the areas of the bores being selected accordingly. It is equally possible for the loading orifice system to be upstream of the control orifice system. For example the arrangement may be as shown in FIGURE 7 of the drawings of application No. 240,852, modified to include a control orifice system the area of which decreases as the pressure drop across it increases, but only to a preselected minimum.

We claim:

1. Borehole drilling equipment comprising a downhole drilling motor, a hydraulic ram adapted to exert axial force on the drilling motor, a positive displacement pump driven by the motor, means defining a flow path for fluid circulated by the pump, control and loading orifice systems in series in the flow path, means connecting the ram with the flow path so that it is subjected to the pressure drop across the loading orifice system only, first means for varying the area of the loading orifice system, means responsive to the respective pressure drops across the two orifices and operative to actuate the first varying means to maintain a direct proportion between the pressure drops, second means for varying the area of the control orifice system, means responsive to the rate of flow of fluid through the control orifice system and operative to actuate the second varying means to reduce the area of the control orifice system with increase of flow through it and vice versa, and means preventing reduction of the area of the control orifice system below a preselected minimum.

2. Equipment according to claim 1, in which the control orifice system consists of a single port obstructed to a variable extent by a cooperating movable member and the member is of less width than the port, so that the port cannot become totally closed.

3. Equipment according to claim 1, in which the control orifice system consists of a single port obstructed to a variable extent by a cooperating movable member, and there is a stop limiting movement of the member to prevent total closure of the port.

4. Equipment according to claim 1, in which the control orifice system consists of a fixed orifice in parallel in the flow path with a port obstructed to a variable extent by a cooperating movable member.

5. Equipment according to claim 1, in which the loading orifice system is downstream of a control orifice system, and means for varying the area of the loading orifice system is actuated by a stepped piston having pressure from upstream of the control orifice system applied to its step, pressure from between the two orifice systems applied to its larger end, and pressure from downstream of the loading orifice system applied to its smaller end.

6. Equipment according to claim 1, in which the control and loading orifice systems are housed with the pump in an island member within a casing for the motor.

7. Equipment according to claim 1, in which the control and loading orifice systems are housed in a piston of the ram.

8. Equipment according to claim 1, in which the control and loading orifice systems are housed in a part of an outer member of the ram.

9. Equipment according to claim 1, including an actuator orifice in series with the control orifice system, the means for varying the area of the control orifice system being an actuator operated by the pressure drop across the actuator orifice.

10. Equipment according to claim 9, in which the actuator orifice is in an exchangeable member which is accessible from outside the equipment upon removal of a closure member.

11. Equipment according to claim 1, in which the control orifice system includes an exchangeable orifice member which is accessible from outside the equipment upon removal of a closure member.

References Cited by the Examiner
UNITED STATES PATENTS

| | | | |
|---|---|---|---|
| 1,923,595 | 8/33 | Temple | 60—52 X |
| 2,102,865 | 12/37 | Vickers | 60—52 |
| 2,381,923 | 8/45 | Obtresal | 60—52 |
| 2,447,442 | 8/48 | Tweedale et al. | 60—52 |
| 2,982,258 | 5/61 | Farkas | 91—468 |

SAMUEL LEVINE, *Primary Examiner.*